W. C. KERN.
AMBULANCE TRAILER BODY.
APPLICATION FILED APR. 21, 1916.
1,200,852.
Patented Oct. 10, 1916.
2 SHEETS—SHEET 1.
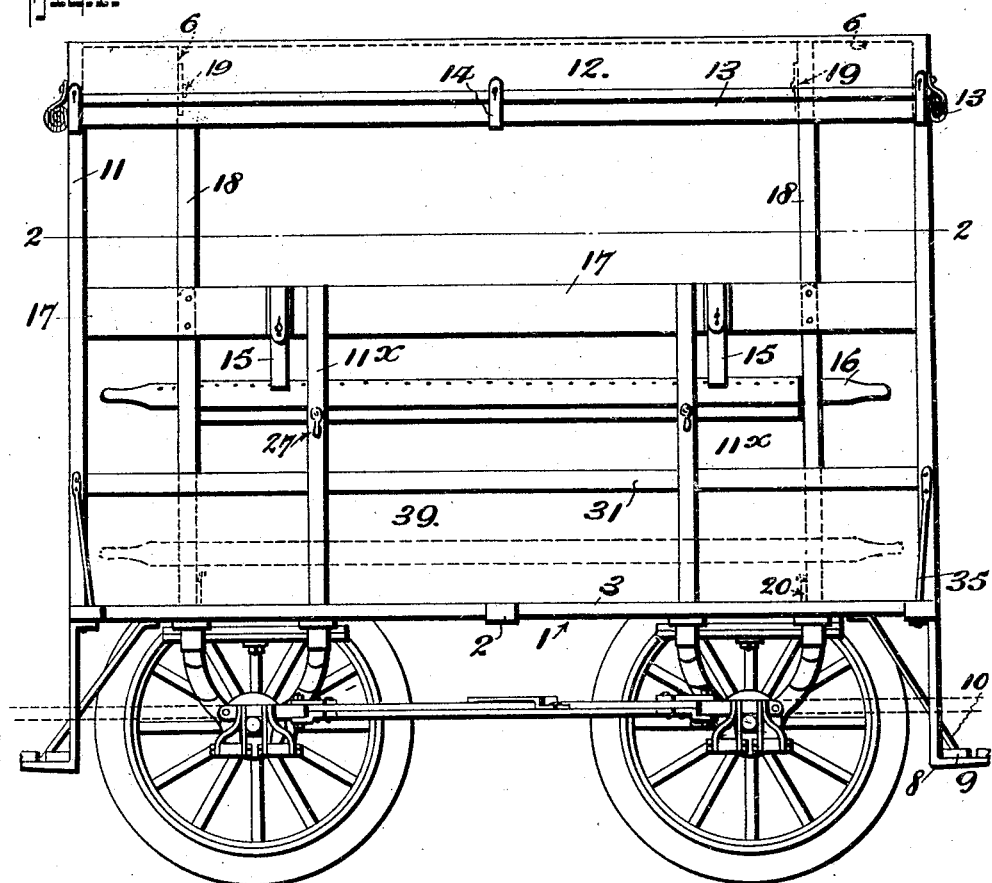
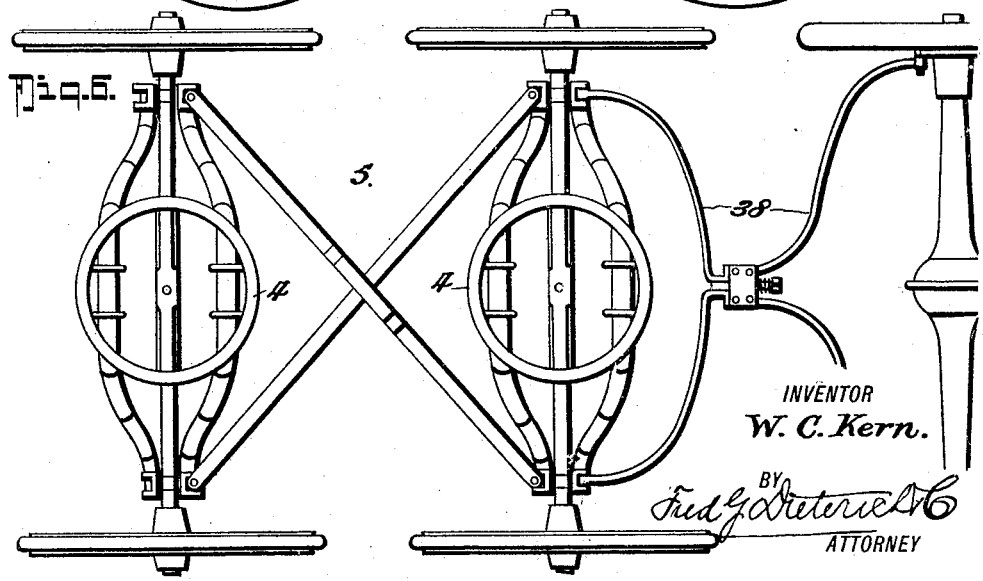
INVENTOR
W. C. Kern.
BY
Fred G. Dieterich
ATTORNEY

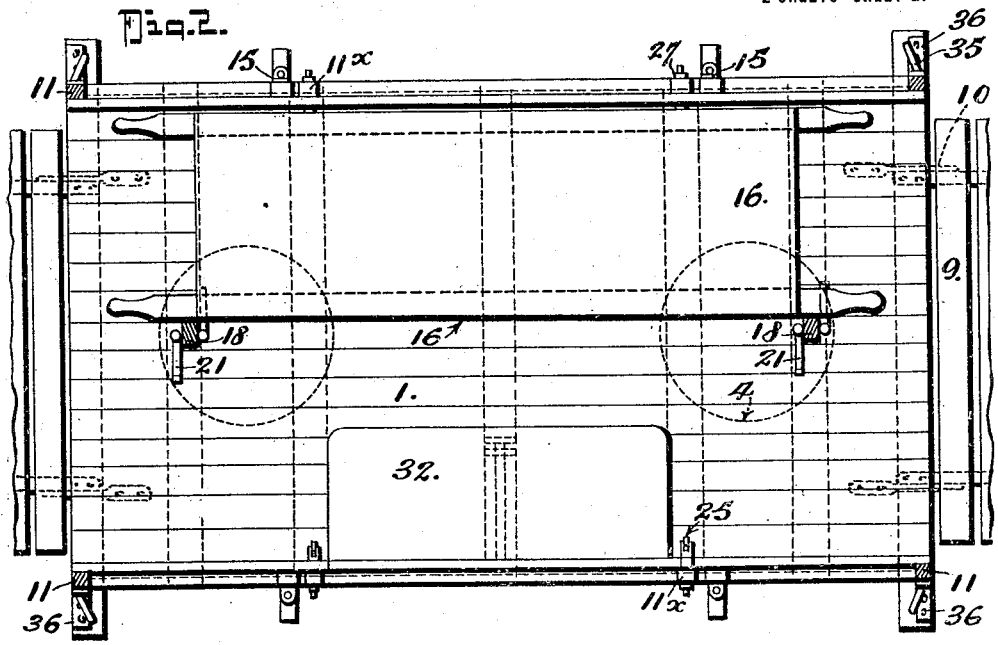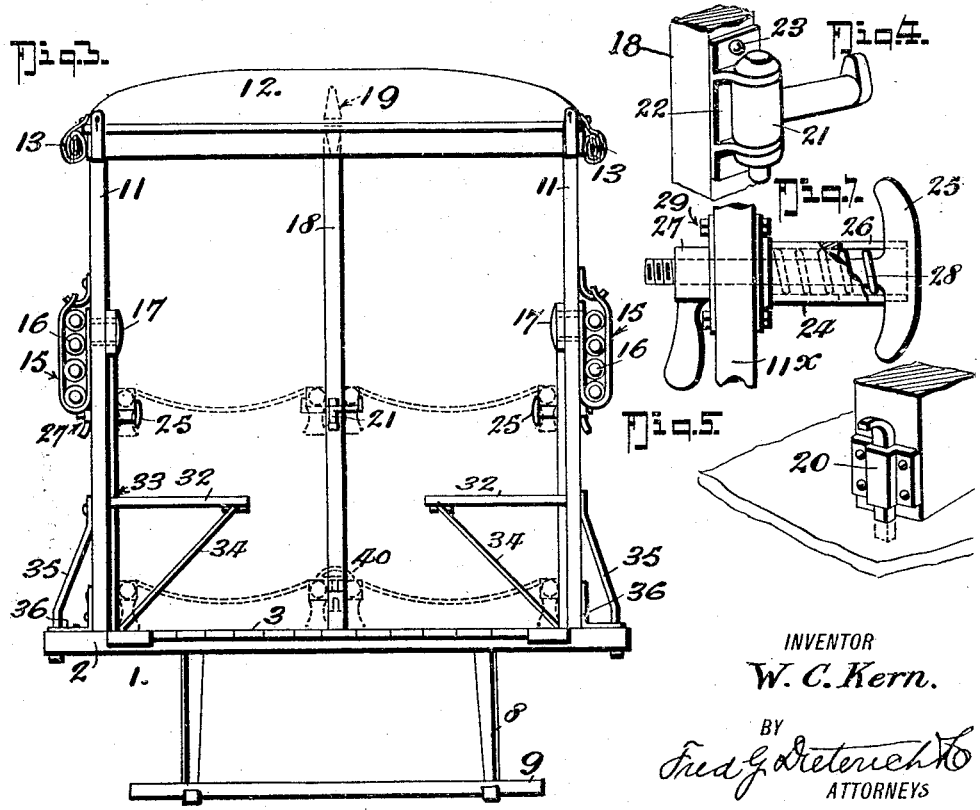

UNITED STATES PATENT OFFICE.

WALTER C. KERN, OF LEAVENWORTH, KANSAS, ASSIGNOR TO THE WM. G. HESSE & SON MFG. CO., INCORPORATED, OF LEAVENWORTH, KANSAS.

AMBULANCE-TRAILER BODY.

1,200,852.  Specification of Letters Patent.  Patented Oct. 10, 1916.

Application filed April 21, 1916. Serial No. 92,720.

*To all whom it may concern:*

Be it known that I, WALTER C. KERN, residing at Leavenworth, in the county of Leavenworth and State of Kansas, have invented certain new and useful Improvements in Ambulance-Trailer Bodies, of which the following is a specification.

My invention is an improved construction of ambulance body especially designed for use on short-turn trailer trucks that are adapted to be towed by automobiles, and the invention has for its object to provide a body of such construction as to be double ended, *i. e.*, accessible from either end and adapted to be towed in either direction.

Again, the invention has for its object to provide an ambulance body of a predetermined carrying capacity so constructed as to be of light weight relatively small over all dimensions and especially adapted for use in connection with the short-turn gear disclosed in the accompanying drawings.

In its generic nature, the invention resides in the provision of an ambulance body consisting of a bed structure from which sides are vertically extended to support a roof structure, the space inside being divided, as it were, into two side sections or compartments by hinged posts which, when not in use, are designed to be folded up into the top out of the way, the center posts and the sides of the body opposite thereto being provided with litter hangers designed to receive the litter poles of standard U. S. Army litters and support the litters one above the other at each side of the vehicle; platforms or steps being provided at each end of the vehicle, by means of which access to the vehicle can be had and lockers are provided under the bed at each end of the vehicle.

The invention also resides in those novel details of construction, combination and arrangement of parts, all of which will be first fully described, then be specifically pointed out in the appended claims, and illustrated in the accompanying drawings, in which:—

Figure 1 is a side elevation of the invention complete (the inner side wheels of the running gear being removed to show the hidden parts and portions of the end platforms or steps being broken away.) Fig. 2 is a horizontal section of the body on the line 2—2 of Fig. 1. Fig. 3 is an end elevation of the body. Fig. 4 is a detail perspective view showing one of the litter clamps or hangers. Fig. 5 is a detail perspective view showing how the foldable posts are secured in the vertical position. Fig. 6 is a top plan view of the running gear used in connection with the body. Fig. 7 is a detail elevation of one of the litter clamps.

Referring now to the accompanying drawing, in which like numerals and letters of reference indicate like parts in all of the figures, 1 represents the bed structure which consists of the cross sills 2 and the longitudinal flooring 3 beneath which the fifth wheels 4—4 of the short-turn gear structure 5 (see Fig. 6) is secured. Lockers 6 are supported at each end under the top or deck, for water and supplies. Hangers 8 sustain the step slats 9.

10 are braces for the steps, as best shown in Figs. 1 and 3 of the drawings.

11 are the side uprights or posts which extend from the sills 2 upwardly and sustain the top 12, the top being of the slatted type covered with a suitable water-proof fabric.

13 are roll curtains of the usual construction which are secured to the top 12 and are adapted to be let down to cover the sides and ends of the body and when not in use the curtains are held up by suitable hanger straps 14.

15 designates the litter hangers that are secured to the outside of the body and are designed to sustain the folded litters 16 when the same are not in use (see Fig. 3).

17 designate lazy backs which extend the length of the body and are secured to the uprights 11 and 11$^x$ on the inside of the same.

Located in the central vertical longitudinal plane of the body is a pair of uprights 18, each being hinged at 19 to the top and designed to be folded up into the top out of the way when not in use, or to be held in a vertical position by suitable catches 20 (see Fig. 5). The center posts 18 carry suitable litter hangers 21, the construction of which is best shown in Fig. 4 of the drawings, by reference to which it will be seen that each litter hanger comprises a relatively fixed support 22 which is secured at 23 to the post 18 and is designed to swing over and receive the pole of the litter, the pole being held in place by a latch 24 (see Fig. 7), whose head 25 is held against the post by turning the wing nut 27, the head 25 sliding in a slot 24, a spring 28 pressing the head 25 outwardly to allow the latch 24 to be released to permit disengagement of the litter pole. The clamps or hangers 24 are fastened at 29 to the posts 11ˣ at the sides of the vehicle.

39 designates the side paneling which consists of a sheet metal sheating mounted on longitudinal slats 31.

32 designates seats which are hinged at 33 and are designed to fold up against the side of the middle side post 11 when not in use, but when the seats are in use they are let down to the position shown in Fig. 3 and are sustained by struts 34.

Other litter clamps 40 are provided for holding the lower litters (see Fig. 3) each clamp 40 engaging two litters one in each side of the vehicle.

35 designate braces for the corner posts 11 and 36 are the angle braces for connecting the posts 11 with the sills 2.

The short-turn gear with which my body is especially designed for use forms no part, *per se*, of the present invention, and therefore I do not make any detailed description of such short-turn gear nor lay any claim *per se*, thereto.

It will be seen that by my construction of ambulance body, particularly when used in connection with the short-turn gear, a very compact and efficient ambulance trailer body is provided which can be hitched from either end to the drawing vehicle by means of the towing connection 38 (see Fig. 6).

From the foregoing description, taken in connection with the accompanying drawing, it is thought the complete construction, operation and advantages of my invention will be readily understood by those skilled in the art.

What I claim is:

1. In an ambulance, a floor or bed structure adapted to be mounted on the running gear and including cross sills and flooring, side posts extending up from said sills, a top on said side posts, side paneling sustained by said side posts, front and rear center posts hinged to the top structure and detachably secured to the flooring and adapted to be folded up into the top when not in use, litter hangers carried by said center posts on each side, other litter hangers sustained by the sides of the body opposite the post hangers, and a foldable seat hinged to each side wall and extending longitudinally of the body, said foldable seats adapted to be folded up parallel with the side when the litters are in use, substantially as shown and described.

2. In an ambulance, a floor or bed structure adapted to be mounted on the running gear and including cross sills and flooring, side posts extending up from said sills, a top on said side posts, side paneling sustained by said side posts, front and rear center posts hinged to the top structure and detachably secured to the flooring and adapted to be folded up into the top when not in use, litter hangers carried by said center posts on each side, other litter hangers sustained by the sides of the body opposite the post hangers, a foldable seat hinged to each side wall and extending longitudinally of the body, said foldable seats adapted to be folded up parallel with the side when the litters are in use, and platform steps at each end of the body pendently supported from the floor or bed structure, and lockers beneath the top or deck structure near the ends of the same.

3. In an ambulance, a floor or bed structure adapted to be mounted on the running gear and including cross sills and flooring, side posts extending up and from said sills, a top on said side posts, front and rear center posts hinged at one end to be folded out of the way and detachably secured at their other end to be held in vertical position when in use, litter hangers carried by said center posts on each side, other litter hangers sustained by the sides of the body opposite the post hangers, and foldable seats hinged to the sides of the body and adapted to be folded up parallel with the sides when the litters are in use, substantially as shown and described.

WALTER C. KERN.

Copies of this patent may be obtained for five cents each, by addressing the "Commissioner of Patents, Washington, D. C."